W. PHILLIPS.
PROCESS FOR TREATING COBALT SILVER ORES.
APPLICATION FILED OCT. 7, 1913.

1,127,506.                                               Patented Feb. 9, 1915.

Cobalt Silver Ores

Smelting with Copper residue and Raw iron Matte

- Nickel and Cobalt Speise containing Silver and Copper
- Argent Copper Matte
- Slags Argent Copper Matte Ziervogel process Copper residue
Smelted with Cobalt Silver ores.

Speise  Removal of Silver and Copper
Smelted with Raw iron Matte

- Speise Free of Silver and Copper
  - Seperation of Nickel Cobalt and Arsenic
- Iron Matte Containing Silver and Copper
  - Smelted with Cobalt Silver Ores.

Witnesses:
Elsie Greenberger
Frank C. Briggs

Inventor:
William Phillips
By J. B. _____
  Attorney

UNITED STATES PATENT OFFICE.

WILLIAM PHILLIPS, OF SWANSEA, WALES.

PROCESS FOR TREATING COBALT-SILVER ORES.

1,127,506. Specification of Letters Patent. Patented Feb. 9, 1915.

Application filed October 7, 1913. Serial No. 793,796.

*To all whom it may concern:*

Be it known that I, WILLIAM PHILLIPS, subject of the King of Great Britain and Ireland, residing at 38 Beechwood road, Swansea, in the county of Glamorgan, Wales, have invented new and useful Improvements in Processes for Treating Cobalt-Silver Ores, of which the following is a specification.

According to my process the cobalt silver ores are smelted in the raw state in a blast or reverberatory furnace, preferably the latter together with a mixture of raw iron matte (sulfid of iron produced by smelting iron pyrites) and copper residue which remains after the extraction of silver by the well known Ziervogel process, when speiss, argentiferous copper matte and slags are produced.

About 82% of the silver in the ore passes into the copper matte, and about 17% passes into the speiss, also about 16% of the copper in the matte passes into the speiss. The argentiferous copper matte containing sulfids of copper and iron will contain between 2000 ozs. and 3000 ozs. silver per ton, and about 25% of copper.

The silver and copper in the speiss I extract by smelting the speiss in a reverberatory furnace in the raw state, with raw iron matte (sulfid of iron produced by smelting iron pyrites), when about 60% of the silver and copper in the speiss passes into the iron matte on the first smelting. The smelting of the speiss with fresh portions of iron matte is repeated three or more times when the speiss is practically free of silver and copper, and in a condition suitable for treatment for the separation of the nickel and cobalt, contained in the original one. The iron matte which now contains the silver and copper that were in the speiss is utilized in the raw state in the smelting of the silver ores and copper residue, using the necessary proportion to reduce the copper oxid in the residue into a sulfid (matte) and producing the same weight and percentage of copper in the matte formed, that the residue contained, thus enabling the same copper to be used indefinitely for the collection of the silver.

The oxid of iron in the residue combines with the silica in the ore, producing the required composition slag. The silver in the argentiferous copper matte is extracted by the known Ziervogel process. The matte is crushed to a fineness that will pass through a suitable screen say about 16 mesh then calcined in a mechanical stirring calciner; the calcined matte again crushed to a fineness that will pass through a suitable screen of about 40 mesh, and further calcined in hand stirring calciners. The calcining is continued until the silver is converted into the state of sulfate. It is then taken to large round tanks and hot water allowed to percolate through, which dissolves the sulfate of silver. The solution passes out through the false bottom into rectangular tanks containing a large number of copper plates, where the silver is deposited on the copper and an equivalent amount of copper to that of silver deposited, passes into solution as shown by the following equation.

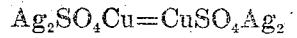

$$Ag_2SO_4 Cu = CuSO_4 Ag_2$$

The solution after passing through the silver depositing tanks, passes on through a series of tanks containing scrap iron which precipitates the copper. The precipitated silver is taken to tubs and washed with very dilute sulfuric acid, steam and air passed into it, to oxidize and dissolve any small particles of copper that should be taken up off the plates. The solution is then run into the copper precipitating tanks, and the silver after washing with fresh water is pressed into brick form, then melted in a test furnace, refined and poured into cast iron molds. The copper residue consisting principally of copper oxid from the argentiferous copper matte after washing out the silver is smelted with the cobalt silver ore, and raw iron matte, when the copper oxid is converted into sulfid (matte) again, thus making the same copper a continuous means of collecting the silver and enabling the whole of it to be washed out and recovered.

The argentiferous copper matte formed on smelting the silver ore mixture will contain from 4% to 6% of nickel and cobalt; also the iron matte after removing the silver and copper from the speiss, will contain about 2% of nickel and cobalt all of which again combines with some of the excess arsenic in the ore, and forms speiss and is thus recovered without additional cost. There is therefore very little loss of these metals; fully 95% can be recovered.

The arsenic which is such an objectionable element in the treatment of ores and products where silver is present, is advantageous in carrying out my process as it collects and keeps intact nearly the whole of the nickel and cobalt without interfering with, or being injurious in the separation and recovery of the silver and copper.

The accompanying drawing is a diagrammatic illustration showing the various steps in the process and is self explanatory.

What I claim as my invention and desire to secure by Letters Patent is:—

1. In a process for the treatment of cobalt silver ores, smelting the said ores in the raw state, together with raw iron matte and copper residue thereby producing speiss, argentiferous copper matte and slags.

2. In a process for the treatment of cobalt silver ores, smelting the said ores in the raw state, together with raw iron matte and copper residue thereby producing speiss, argentiferous copper matte and slags, and smelting the speiss produced from such ores with raw iron matte and repeating the smelting with fresh portions of raw iron matte until practically the whole of the silver and copper has been removed from the speiss.

3. In a process for the treatment of cobalt silver ores, smelting the said ores in the raw state together with raw iron matte and copper residue thereby producing speiss, argentiferous copper matte and slags, and smelting the speiss produced from such ores with raw iron matte and repeating the smelting with fresh portions of raw iron matte until practically the whole of the silver and copper has been removed from the speiss, leaving iron matte containing silver and copper, said iron matte being then smelted with silver ores and copper residue.

4. In a process for treating cobalt silver ores, smelting the ores in the raw state with raw iron matte and copper residue to produce speiss, argentiferous copper matte and slags, smelting the speiss in the raw state with raw iron matte a sufficient number of times to remove the silver and copper therefrom and removing the nickel and cobalt which combines with some of the excess arsenic in the ore, from the residue of the speiss.

In witness whereof I have hereunto set my hand in the presence of two witnesses.

WILLIAM PHILLIPS.

Witnesses:
 FRANK WILLIAM PATTISON
 H. D. JAMESON.